(12) United States Patent
Kim

(10) Patent No.: US 9,616,871 B2
(45) Date of Patent: Apr. 11, 2017

(54) METHOD OF OPERATING BRAKE SYSTEM

(71) Applicant: HYUNDAI MOBIS Co., Ltd., Yongin-si, Gyeonggi-do (KR)

(72) Inventor: Tae Youn Kim, Yongin-si (KR)

(73) Assignee: HYUNDAI MOBIS CO., LTD., Yongin-si, Gyeonggi-do (KR)

(*) Notice: Subject to any disclaimer, the term of this patent is extended or adjusted under 35 U.S.C. 154(b) by 28 days.

(21) Appl. No.: 15/010,810

(22) Filed: Jan. 29, 2016

(65) Prior Publication Data
US 2016/0221559 A1 Aug. 4, 2016

(30) Foreign Application Priority Data
Jan. 29, 2015 (KR) .......................... 10-2015-0014513

(51) Int. Cl.
*B60T 13/68* (2006.01)
*B60T 7/04* (2006.01)
*B60T 13/66* (2006.01)
*B60T 13/74* (2006.01)

(52) U.S. Cl.
CPC ............ *B60T 13/686* (2013.01); *B60T 7/042* (2013.01); *B60T 13/662* (2013.01); *B60T 13/745* (2013.01)

(58) Field of Classification Search
CPC ................................ B60T 13/686; B60T 7/042
USPC ............................................................ 701/70
See application file for complete search history.

(56) References Cited

U.S. PATENT DOCUMENTS

| | | | | |
|---|---|---|---|---|
| 8,052,226 B2 * | 11/2011 | Yang | ........................ | B60T 7/042 303/11 |
| 8,328,298 B2 * | 12/2012 | Yang | ........................ | B60T 7/042 303/115.1 |
| 2014/0084674 A1 * | 3/2014 | Lee | ........................ | B60T 8/4068 303/6.01 |
| 2016/0121867 A1 * | 5/2016 | Jung | ...................... | B60T 13/745 701/78 |

* cited by examiner

*Primary Examiner* — Yazan Soofi
(74) *Attorney, Agent, or Firm* — Paratus Law Group, PLLC

(57) ABSTRACT

The invention provides a method of operating a brake system, including: transmitting a valve operating command to an inlet valve an outlet valve calculating a valve operating time of each of the inlet valve and the outlet valve based on a difference in pressure between both ends of each of the inlet valve and the outlet valve; performing the linear or On-Off control for increasing pressure and calculating the quantity of brake oil passing through the inlet valve and, the ON-OFF control for decreasing pressure and calculating the quantity of brake oil passing through the outlet valve; and calculating hydraulic pressure in the wheel brake cylinder based on the quantity of brake oil passing through the inlet valve and the quantity of brake oil passing through the outlet valve.

9 Claims, 4 Drawing Sheets

METHOD OF OPERATING BRAKE SYSTEM

CROSS-REFERENCE TO RELATED APPLICATIONS

The present application claims priority to Korean Patent Application Number 10-2015-0014513 filed Jan. 29, 2015, the entire contents of which the application is incorporated herein for all purposes by this reference.

TECHNICAL FIELD

The present invention relates to a method of operating a brake system, and more particularly, to a method of operating a brake system, capable of easily calculating hydraulic pressure in a wheel brake cylinder in ESC integrated braking which enables active control.

BACKGROUND

In general, an electronic hydraulic brake apparatus detects pedal pressure caused by a driver by using a sensor, and then adjusts braking pressure applied to each wheel by using a hydraulic modulator.

The electronic hydraulic brake apparatus is provided with a sensor which detects a stroke of a pedal so as to recognize braking pressure desired by the driver, and a pedal simulator which allows the driver to feel pedal pressure that the driver may feel from a general hydraulic brake apparatus.

In a normal state, when the driver presses a brake pedal, pressure is generated by a back-up master cylinder, and the pressure generated by the back-up master cylinder is transmitted to the pedal simulator, thereby allowing the driver to feel reaction force.

A control unit determines braking force desired by the driver by using a pedal stroke sensor, a pressure sensor or the like, and operates a main master cylinder to cause a wheel brake to generate braking force.

SUMMARY

The present invention has been made in an effort to provide a method of operating a brake system, capable of easily estimating hydraulic pressure in a wheel brake cylinder in ESC integrated braking which enables active control.

An exemplary embodiment of the present invention provides a method of operating a brake system, the method including: transmitting a valve operating command to an inlet valve which supplies brake oil to a wheel brake cylinder, and an outlet valve which allows the brake oil in the wheel brake cylinder to be returned into a resevoir; calculating a valve operating time of each of the inlet valve and the outlet valve based on a difference in pressure between both ends of each of the inlet valve and the outlet valve; determining whether the valve operating command is a linear control command for increasing pressure; and performing the linear control and calculating the quantity of brake oil passing through the inlet valve when the valve operating command is the linear control command for increasing pressure.

The method may include determining whether the valve control command is an ON-OFF control command for decreasing pressure, such that the ON-OFF control command at the time of decreasing pressure is carried out when the valve control command is the ON-OFF control command for decreasing pressure, and the quantity of brake oil passing through the outlet valve is calculated.

The method may include determining whether the valve control command is an ON-OFF control command for increasing pressure, such that the ON-OFF control command for increasing pressure is carried out, and the quantity of brake oil passing through the inlet valve is calculated.

A controller may calculate the current the quantity of brake oil in the wheel brake cylinder by adding the quantity of brake oil passing through the inlet valve according to the current brake control to the quantity of brake oil at the time of previous brake control of the wheel brake cylinder, and by subtracting the quantity of brake oil passing through the outlet valve, and calculate hydraulic pressure in the wheel brake cylinder.

According to the method of operating the brake system according to the present invention, it is possible to conveniently calculate hydraulic pressure required for four wheel brake cylinders in ABS, VDC, and TCS braking situations, thereby reducing manufacturing costs.

DETAILED DESCRIPTION

Figure 1:
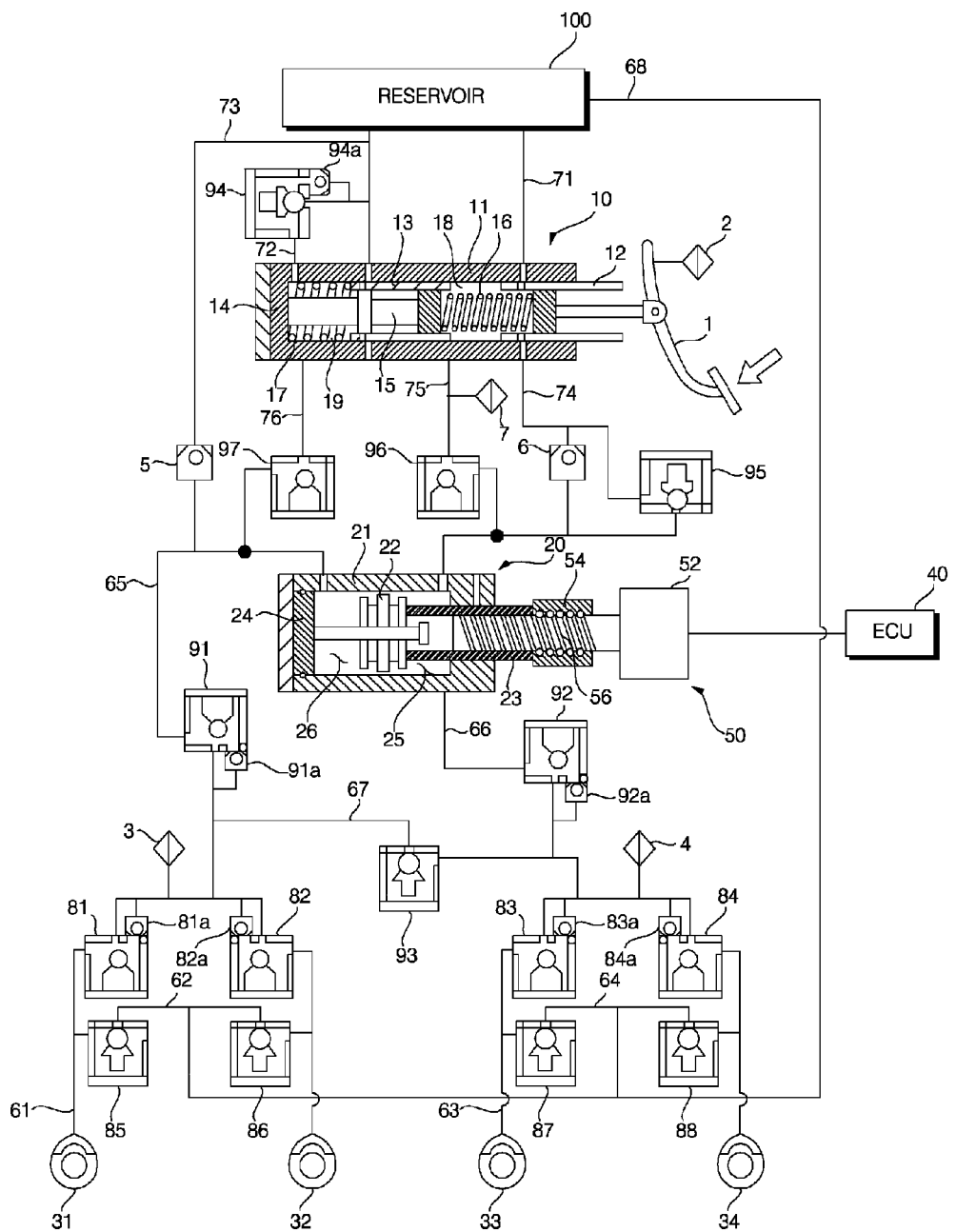
FIG. 1 is a systematic view illustrating a brake system according to the present invention.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Unless there are other definitions, all terms used in the present specification (including technical and scientific terms) have the meanings that those having ordinary skill in the technical field to which the present invention pertains typically understand. In addition, terms defined in a generally used dictionary shall not be construed in ideal or excessively formal meanings unless they are clearly and specially defined in the present specification.

Hereinafter, an exemplary embodiment will be described in more detail with reference to the drawings.

FIG. 1 is a systematic view illustrating a brake system according to the present invention.

The brake system according to the present invention includes a back-up master cylinder 10, a main master cylinder 20, and wheel brake cylinders 31, 32, 33, and 34.

The back-up master cylinder 10 will be described below.

The back-up master cylinder 10 includes a back-up body 11, a first back-up piston 12, a second back-up piston 13, a back-up stopper 14, a reaction force damper 15, a first elastic member 16, and a second elastic member 17.

The back-up body 11 is formed to have a structure with a vacant internal space. The first back-up piston 12 and the second back-up piston 13 are disposed in the internal space of the back-up body 11 so as to be rectilinearly moved in left and right directions. The internal space of the back-up body 11 is divided into a first back-up chamber 18 which is a space positioned between the first back-up piston 12 and the second back-up piston 13, and a second back-up chamber 19 which is a space positioned between the second back-up piston 12 and the back-up stopper 14.

The back-up body 11 is opened at left and right ends. A left end of the first back-up piston 12 is inserted and disposed into the opened right end of the back-up body 11, such that the opened right end of the back-up body 11 is closed by the first back-up piston 12. A right end of the first back-up piston 12 is disposed to protrude from the right end of the back-up body 11, and a brake pedal 1 is connected to the protruding right end of the first back-up piston 12. A stroke sensor 2, which detects a stroke of the brake pedal 1 when a driver presses the brake pedal 1, may be disposed on the brake pedal 1. The first back-up piston 12 is installed to be rectilinearly movable in the left and right directions in a state in which the first back-up piston 12 is in close contact with an inner wall of the back-up body 11.

A right end of the back-up stopper 14 is inserted and disposed into the opened left end of the back-up body 11, such that the opened left end of the back-up body 11 is closed by the back-up stopper 14.

The second back-up piston 13 is installed in the internal space in the back-up body 11 so as to be rectilinearly movable in the left and right directions in a state in which the second back-up piston 13 is in close contact with the inner wall of the back-up body 11. The second back-up piston 13 is disposed to be spaced apart from the first back-up piston 12 and the back-up stopper 14. The first elastic member 16 is disposed between the first back-up piston 12 and the second back-up piston 13 which are spaced apart from each other. The first elastic member 16 is formed as a spring, such that one end of the first elastic member 16 elastically supports the first back-up piston 12, and the other end of the first elastic member 16 elastically supports the second back-up piston 13. The second elastic member is disposed between the second back-up piston 13 and the back-up stopper 14 which are spaced apart from each other. The second elastic member 17 is formed as a spring, such that one end of the second elastic member 17 elastically supports the second back-up piston 13, and the other end of the second elastic member 17 elastically supports the back-up stopper 14.

The second back-up piston 13 is formed to have a structure with a vacant internal space, and the second back-up piston 13 is closed at a right side directed toward the first back-up piston 12, and opened at a left side directed toward the back-up stopper 14.

The back-up stopper 14 penetrates the second elastic member 17, and the right end of the back-up stopper 14 is inserted and disposed into the opened left end of the second back-up piston 13.

The reaction force damper 15 is disposed in the second back-up piston 13, and one end of the reaction force damper 15 is supported by the right end of the back-up stopper 14, and the other end of the reaction force damper 15 is supported by the right side of the second back-up piston 13. When the second back-up piston 13 is moved to the left side, the reaction force damper 15 is compressed to allow the driver to feel reaction force which occurs when the driver presses the brake pedal 1. In the present exemplary embodiment, the reaction force damper 15 is made of rubber, because of elastic restoring force of the rubber, such that the driver may feel reaction force which occurs when the driver presses the brake pedal 1.

The main master cylinder 20 will be described below.

The main master cylinder 20 is operated by a motor 52 controlled by a controller 40, and generates and supplies hydraulic pressure to the wheel brake cylinders 31, 32, 33, and 34. Here, the controller 40 may be an electronic control unit (ECU) that is a representative control device in the automobile. When the driver presses the brake pedal 1, the stroke sensor 2 detects a stroke of the brake pedal 1 and then transfers the stroke to the controller 40, and the controller 40 controls the motor 52 based on the stroke of the brake pedal 1 which is detected by the stroke sensor 2, thereby controlling hydraulic pressure generated by the main master cylinder 20.

The main master cylinder 20 includes a main body 21, a main piston 22, a rod 23, and a main stopper 24.

The main body 21 is formed to have a structure with a vacant internalspace. The main piston 22 is disposed in the internal space of the main body 21 so as to be rectilinearly movable in the left and right directions. The internal space of the main body 21 is divided into two spaces by the main piston 22, and includes a first main chamber 25 which is a space disposed at a right side based on the main piston 22, and a second main chamber 26 which is disposed at a left side based on the main piston 22.

When the main piston 22 moves forward to the left side, the first main chamber 25 is widened, and the second main chamber 26 is narrowed. On the contrary, when the main piston 22 moves rearward to the right side, the first main chamber 25 is narrowed, and the second main chamber 26 is widened.

The main body 21 is opened at left and right ends. The left end of the main body 21 is fully opened, and the right end of the main body 21 is partially opened only at a central portion thereof. A left end of the rod 23 is inserted into the opened right end of the main body 21. The left end of the rod 23 is connected with the main piston 22 inside the main body 21. The rod 23 may be formed integrally with the main piston 22.

A diameter of the main piston 22 is greater than a diameter of the rod 23, and a diameter of the rod 23 is smaller than a diameter of the main piston 22.

A right end of the rod 23 protrudes from the right side of the main body 21, and an actuator 50, which allows the rod 23 to rectilinearly move in the left and right directions, is installed at the protruding right end of the rod 23.

The actuator 50 includes the motor 52, and a female screw and a male screw 56 which convert rotational motion of the motor 52 into rectilinear motion to allow the rod 23 to rectilinearly move in the left and right directions. Screw threads are formed on an inner circumferential surface of the female screw 54. Further, the female screw 54 is coupled to the right end of the rod 23. Screw threads, which are engaged with the screw threads of the female screw 54, are formed on an outer circumferential surface of the male screw 56, and the male screw 56 is inserted into the female screw 54. The male screw 56 is connected with a rotor shaft of the motor 52, and rotates together with the rotor shaft of the motor 52 when the rotor shaft of the motor 52 is rotated, thereby allowing the female screw 54 to rectilinearly move, and allowing the rod 23 to rectilinearly move, and as a result, the main piston 22 may rectilinearly move in the left and right directions.

A right end of the main stopper 24 is inserted and disposed into the opened left end of the main body 21, such that the opened left end of the main body 21 is closed by the main stopper 24.

The main piston 22 is installed in the internal space in the main body 21 so as to be rectilinearly movable in the left and right directions in a state in which the main piston 22 is in close contact with an inner wall of the main body 21. A center of an outer circumferential surface of the main piston 22 is in close contact with the inner wall of the main body 21, and left and right ends of the outer circumferential surface of the main piston 22 are disposed to be spaced apart from the inner wall of the main body 21. A central portion of the main piston 22 is formed in a hollow shape, and a central portion of the rod is also formed in a hollow shape. The male screw 56 penetrates the female screw 56, such that the left end of the male screw 56 is disposed in the rod 23. The main stopper 24 penetrates the main piston 22, such that the right end of the main stopper 24 is inserted and disposed into the rod 23.

While the main piston 22 and the rod 23 are disposed in the first main chamber 25, the rod 23 is not disposed in the second main chamber 26, and only the main piston 22 is disposed in the second main chamber 26. Therefore, an effective cross-section area of the second main chamber 26, which compresses brake oil in the second main chamber 26 when the main piston 22 moves forward to the left side, is greater than an effective cross-sectional area of the first main chamber 25 which compresses brake oil in the first main chamber 25 when the main piston 22 moves rearward to the right side.

The wheel brake cylinders 31, 32, 33, and 34 will be described below.

The wheel brake cylinders 31, 32, 33, and 34 include a first wheel brake cylinder 31 which brakes a front left wheel of the automobile, a second wheel brake cylinder 32 which brakes a rear right wheel of the automobile, a third wheel brake cylinder which brakes a rear left wheel of the automobile, and a fourth wheel brake cylinder 34 which brakes a front right wheel of the automobile.

A coupling relationship among the back-up master cylinder 10, the main master cylinder 20, and the wheel brake cylinders 31, 32, 33, and 34, which are configured as described above, will be described below.

The first wheel brake cylinder 31 and the second wheel brake cylinder 32 are connected through a first brake flow path 61. That is, one end of the first brake flow path 61 is connected to the first wheel brake cylinder 31, and the other end of the first brake flow path 61 is connected to the second wheel brake cylinder 32.

A first inlet valve 81 and a second inlet valve 82, which open and close the first brake flow path 61, are installed in the first brake flow path 61. The first inlet valve 81 is disposed to be adjacent to the first wheel brake cylinder 31, and the second inlet valve 82 is disposed to be adjacent to the second wheel brake cylinder 32.

A check valve 81a, which prevents a reverse flow of the brake oil, is installed in the first inlet valve 81, and a check valve 82a, which prevents a reverse flow of the brake oil, is installed in the second inlet valve 82.

A first pressure sensor 3, which measures pressure of the brake oil in the first brake flow path 61, is installed in the first brake flow path 61. The first pressure sensor 3 is installed in the first brake flow path 61 between the first inlet valve 81 and the second inlet valve 82.

One end of a first recovery flow path 62 is connected to the first brake flow path 61 between the first wheel brake cylinder 31 and the first inlet valve 81. Further, the other end of the first recovery flow path 62 is connected to the first brake flow path 61 between the second wheel brake cylinder 32 and the second inlet valve 82.

A first outlet valve 85 and a second outlet valve 86, which open and close the first recovery flow path 62, are installed in the first recovery flow path 62. The first outlet valve 85 is disposed to be adjacent to one end of the first recovery flow path 62, and the second outlet valve 86 is disposed to be adjacent to the other end of the first recovery flow path 62.

The third wheel brake cylinder 33 and the fourth wheel brake cylinder 34 are connected through a second brake flow path 63. That is, one end of the second brake flow path 63 is connected to the third wheel brake cylinder 33, and the other end of the second brake flow path 63 is connected to the fourth wheel brake cylinder 34.

A third inlet valve 83 and a fourth inlet valve 84, which open and close the second brake flow path 63, are installed in the second brake flow path 63. The third inlet valve 83 is disposed to be adjacent to the third wheel brake cylinder 33, and the fourth inlet valve 84 is disposed to be adjacent to the fourth wheel brake cylinder 34.

A check valve 83a, which prevents a reverse flow of the brake oil, is installed in the third inlet valve 83, and a check valve 84a, which prevents a reverse flow of the brake oil, is installed in the fourth inlet valve 84.

A second pressure sensor 4, which measures pressure of the brake oil in the second brake flow path 63, is installed in the second brake flow path 63. The second pressure sensor 4 is installed in the second brake flow path 63 between the third inlet valve 83 and the fourth inlet valve 84.

One end of a second recovery flow path 64 is connected to the second brake flow path 63 between the third wheel brake cylinder 33 and the third inlet valve 83. Further, the other end of the second recovery flow path 64 is connected to the second brake flow path 63 between the fourth wheel brake cylinder 34 and the fourth inlet valve 84. A third outlet valve 87 and a fourth outlet valve 88, which open and close the second recovery flow path 64, are installed in the second recovery flow path 64. The third outlet valve 87 is disposed to be adjacent to one end of the second recovery flow path 64, and the fourth outlet valve is disposed to be adjacent to the other end of the second recovery flow path 64.

One end of a first main flow path 65 is connected to the second main chamber 26. That is, one end of the first main flow path 65 is connected to the main body 21 so that the first main flow path 65 is in communication with the second main chamber 26. Further, the other end of the first main flow path 65 is connected to the first brake flow path 61 between the first inlet valve 81 and the second inlet valve 82.

A first traction control valve 91, which opens and closes the first main flow path 65, is installed in the first main flow path 65. The first traction control valve 91 is a solenoid valve that opens and closes the first main flow path 65 by being controlled by the controller 40, and may be installed in the flow path through which hydraulic pressure in the second main chamber 26 is supplied to the wheel brake cylinders 31, 32, 33, and 34. A check valve 91a is installed in the first traction control valve 91. The check valve 91a is opened when the hydraulic pressure in the second main chamber 26 is a predetermined pressure or higher, thereby diverting the hydraulic pressure so that the hydraulic pressure in the second main chamber 26 may be supplied to the wheel brake cylinders 31, 32, 33, and 34 in a state in which the first traction control valve 91 is closed.

One end of a second main flow path 66 is connected to the first main chamber 25. That is, one end of the second main flow path 66 is connected to the main body 21 so that the second main flow path 66 is in communication with the first main chamber 25. Further, the other end of the second main flow path 66 is connected to the second brake flow path 63 between the third inlet valve 83 and the fourth inlet valve 84.

A second traction control valve 92, which opens and closes the second main flow path 66, is installed in the second main flow path 66. The second traction control valve 92 is a solenoid valve that opens and closes the second main flow path 66 by being controlled by the controller 40, and is installed in the flow path through which the hydraulic pressure in the first main chamber 25 is supplied to the wheel brake cylinders 31, 32, 33, and 34. A check valve 92a is installed in the second traction control valve 92. The check valve 92a is opened when the hydraulic pressure in the first main chamber 25 is a predetermined pressure or higher, thereby diverting the hydraulic pressure so that the hydraulic pressure in the first main chamber 25 may be supplied to the wheel brake cylinders 31, 32, 33, and 34 in a state in which the second traction control valve 92 is closed.

One end of a mixing flow path 67 is connected to the first main flow path 65 between the first traction control valve 91 and the first brake flow path 61. Further, the other end of the mixing flow path 67 is connected to the second main flow path 66 between the second traction control valve 92 and the second brake flow path 63. A mixing valve 93, which opens and closes the mixing flow path 67, is installed in the mixing flow path 67.

One end of a first back-up flow path 71 is connected to the first back-up chamber 18, and the other end of the first back-up flow path 71 is connected to the second back-up chamber 19. That is, one end of the first back-up flow path 71 is connected to the back-up body 11 so that the first back-up flow path 71 is in communication with the first back-up chamber 18, and the other end of the first back-up flow path 71 is connected to the back-up body 11 so that the first back-up flow path 71 is in communication with the second back-up chamber 19. A reservoir 100, which stores the brake oil, is installed in the first back-up flow path 71.

One end of a third recovery flow path 68 is connected to the reservoir 100. Further, the other end of the third recovery flow path 68 is divided into two flow paths, such that one flow path is connected to the first recovery flow path 62 between the first outlet valve 85 and the second outlet valve 86, and the other flow path is connected to the second recovery flow path 64 between the third outlet valve 87 and the fourth outlet valve 88.

One end of the second back-up flow path 72 is connected to the second back-up chamber 19. That is, one end of the second back-up flow path 72 is connected to the back-up body 11 so that the second back-up flow path 72 is in communication with the second back-up chamber 19. The other end of the second back-up flow path 72 is connected to the first back-up flow path 71 between the reservoir 100 and the back-up body 11.

A first back-up valve 94, which opens and closes the second back-up flow path 72, is installed in the second back-up flow path 72. A check valve 94a, which prevents a reverse flow of the brake oil, is installed in the first back-up valve 94.

One end of a third back-up flow path 73 is connected to the first back-up flow path 71 between the other end of the second back-up flow path 72 and the reservoir 100. The other end of the third back-up flow path 73 is connected to the first main flow path 65. A check valve 5, which prevents a reverse flow of the brake oil, is installed in the third back-up flow path 73.

One end of a fourth back-up flow path 74 is connected to the first back-up chamber 18. That is, one end of the fourth back-up flow path 74 is connected to the back-up body 11 so that the fourth back-up flow path 74 is in communication with the first back-up chamber 18. Further, the other end of the fourth back-up flow path 74 is connected to the first main chamber 25. That is, the other end of the fourth back-up flow path 74 is connected to the main body 21 so that the fourth back-up flow path 74 is in communication with the first main chamber 25. A second back-up valve 95, which opens and closes the fourth back-up flow path 74, is installed in the fourth back-up flow path 74. In addition, a check valve 6, which prevents a reverse flow of the brake oil, is installed in the fourth back-up flow path 74.

One end of a fifth back-up flow path 75 is connected to the first back-up chamber 18. That is, one end of the fifth back-up flow path 75 is connected to the back-up body 11 so that the fifth back-up flow path 75 is in communication with the first back-up chamber 18. Further, the other end of the fifth back-up flow path 75 is connected to the fourth back-up flow path 74 between the second back-up valve 95 and the main body 21. A third back-up valve 96, which opens and closes the fifth back-up flow path 75, is installed in the fifth back-up flow path 75. In addition, a third pressure sensor 7, which measures pressure of the brake oil in the fifth back-up flow path 75, is installed in the fifth back-up flow path 75. The third pressure sensor 7 is installed in the fifth back-up flow path 75 between the back-up body 11 and the third back-up valve 96.

One end of a sixth back-up flow path 76 is connected to the second back-up chamber 19. That is, one end of the sixth back-up flow path 76 is connected to the back-up body 11 so that the sixth back-up flow path 76 is in communication with the second back-up chamber 19. Further, the other end of the sixth back-up flow path 76 is connected to the first main flow path 65 between one end of the first main flow path 65 and the other end of the third back-up flow path 73. A fourth back-up valve 97, which opens and closes the sixth back-up flow path 76, is installed in the sixth back-up flow path 76.

The first inlet valve 81 to the fourth inlet valve 84, the first outlet valve 85 to the fourth outlet valve 88, the first traction control valve 91, the second traction control valve 92, the mixing valve 93, and the first back-up valve 94 to the fourth back-up valve 97 are configured as solenoid valves controlled by the controller 40.

The first inlet valve 81, the second inlet valve 82, the third inlet valve 83, and the fourth inlet valve 84 are formed in a normal open type in which the first inlet valve 81, the second inlet valve 82, the third inlet valve 83, and the fourth inlet valve 84 are opened at normal times when a control signal is not inputted from the controller 40.

The first outlet valve 85, the second outlet valve 86, the third outlet valve 87, and the fourth outlet valve 88 are formed in a normal closed type in which the first outlet valve 85, the second outlet valve 86, the third outlet valve 87, and the fourth outlet valve 88 are closed at normal times when a control signal is not inputted from the controller 40.

The first traction control valve 91 and the second traction control valve 92 are formed in a normal open type in which the first traction control valve 91 and the second traction control valve 92 are opened at normal times when a control signal is not inputted from the controller 40. Further, the mixing valve 93 is formed in a normal closed type in which the mixing valve 93 is closed at normal times when a control signal is not inputted from the controller 40.

The first back-up valve 94 is formed in a normal closed type in which the first back-up valve 94 is closed at normal times when a control signal is not inputted from the controller 40. Further, the second back-up valve 95, the third back-up valve 96, and the fourth back-up valve 97 are formed in a normal open type in which the second back-up valve 95, the third back-up valve 96, and the fourth back-up valve 97 are opened at normal times when a control signal is not inputted from the controller 40.

When the brake for an automobile is controlled by the controller 40, the controller 40 closes all of the second back-up valve 95, the third back-up valve 96, and the fourth back-up valve 97. Then, all of the first, second, third, and fourth back-up valves 94, 95, 96, and 97 are closed, such that the flow paths between the back-up master cylinder 10 and the main master cylinder 20 are shut off. Therefore, in this case, the wheel brake cylinders 31, 32, 33, and 34 generate braking force only by the hydraulic pressure supplied from the main master cylinder 20.

However, if electric power is not supplied to the controller 40, the second back-up valve 95, the third back-up valve 96, and the fourth back-up valve 97 are maintained in the open state because the second back-up valve 95, the third back-up valve 96, and the fourth back-up valve 97 are the normal open type.

Therefore, when the driver presses the brake pedal 1, hydraulic pressure, which is formed in the first back-up chamber 18 by the brake oil supplied from the reservoir 100, is supplied to the first main chamber 25 through the fifth back-up flow path 75. In this case, since the fourth back-up flow path 74 is opened by the second back-up valve 95, the first main chamber 25 is maintained in an atmospheric pressure state, such that hydraulic pressure in the first back-up chamber 18 may be smoothly supplied to the first main chamber 25 through the fifth back-up flow path 75.

When the driver presses the brake pedal 1, hydraulic pressure, which is formed in the second back-up chamber 19 by the brake oil supplied from the reservoir 100, is supplied to the second main chamber 26 through the sixth back-up flow path 76.

Meanwhile, the first to fourth inlet valves 81, 82, 83, and 84 are in the open (normal open) state at normal times, and a linear control command or an ON-OFF control command is carried out at the time of increasing pressure by controlling magnetic force in ABS, VDC, and TCS situations, thereby adjusting the amount of increasing pressure, and the first to fourth outlet valves 85, 86, 87, and 88 are in the closed (normal closed) state at normal times, and ON-OFF timing control for decreasing pressure is carried out by controlling opening areas of the valves by controlling the magnetic force in the ABC, VDC, and TCS situations, thereby adjusting the amount of decreasing pressure.

Figure 2:
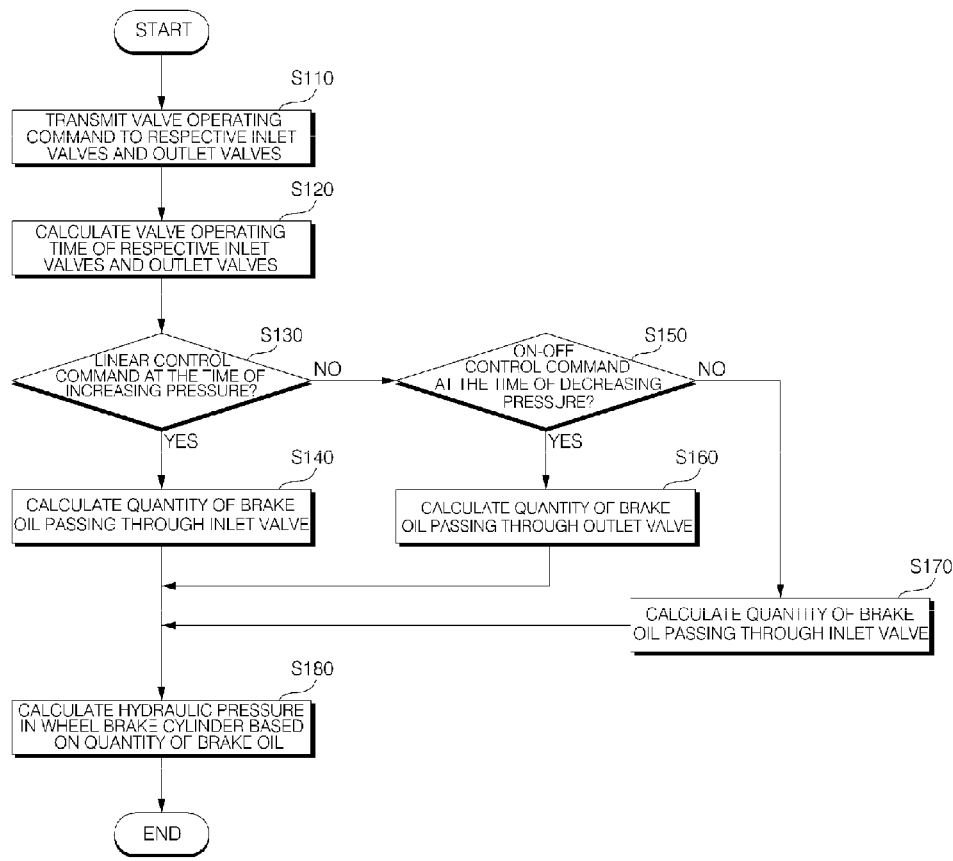
FIG. 2 is a flowchart illustrating a method of controlling the brake system according to the present invention.
Figure 3:
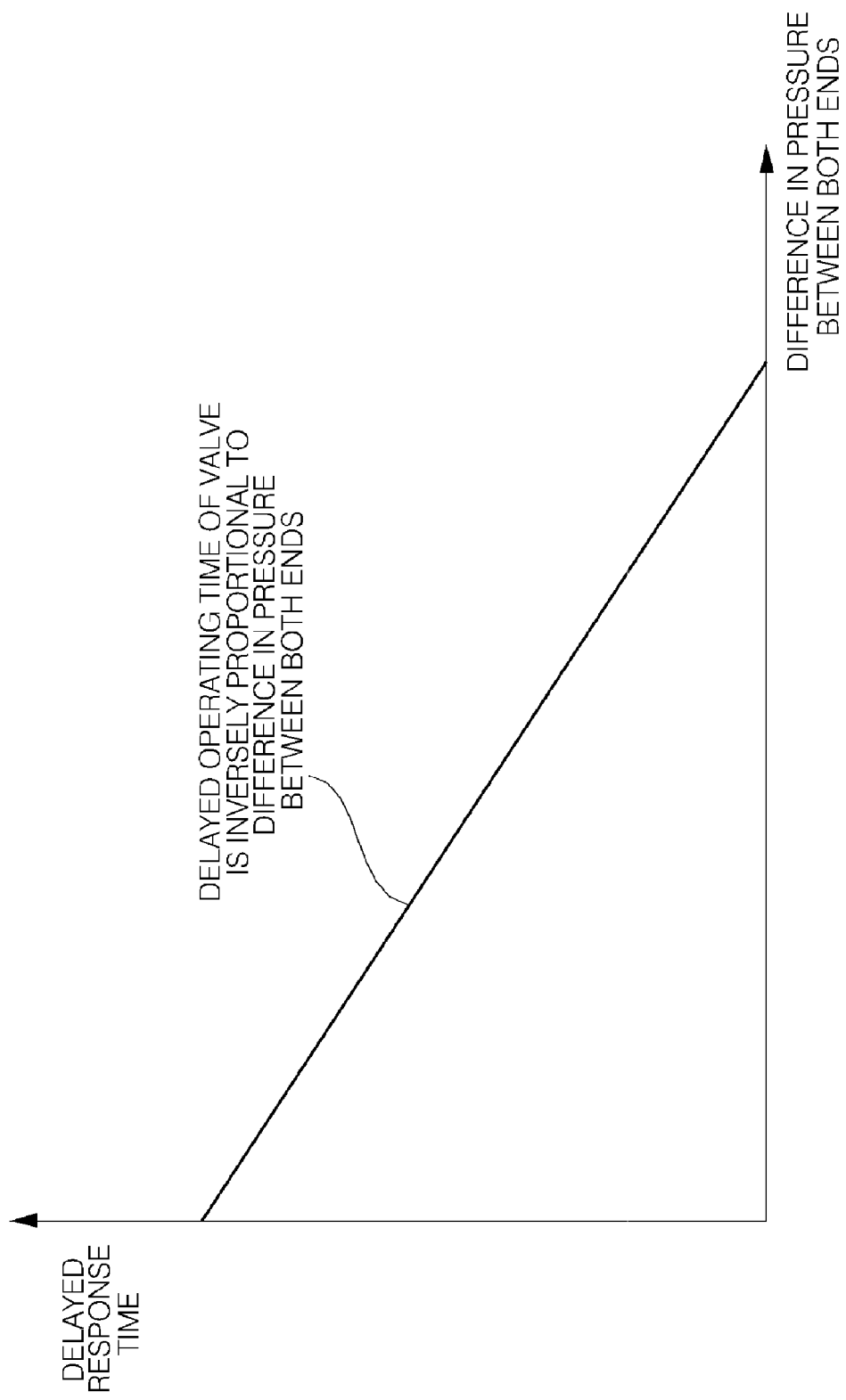
FIG. 3 is a graph illustrating a delayed operating time of a valve in accordance with a difference in pressure between both ends of the valve according to the present invention.
Figure 4:
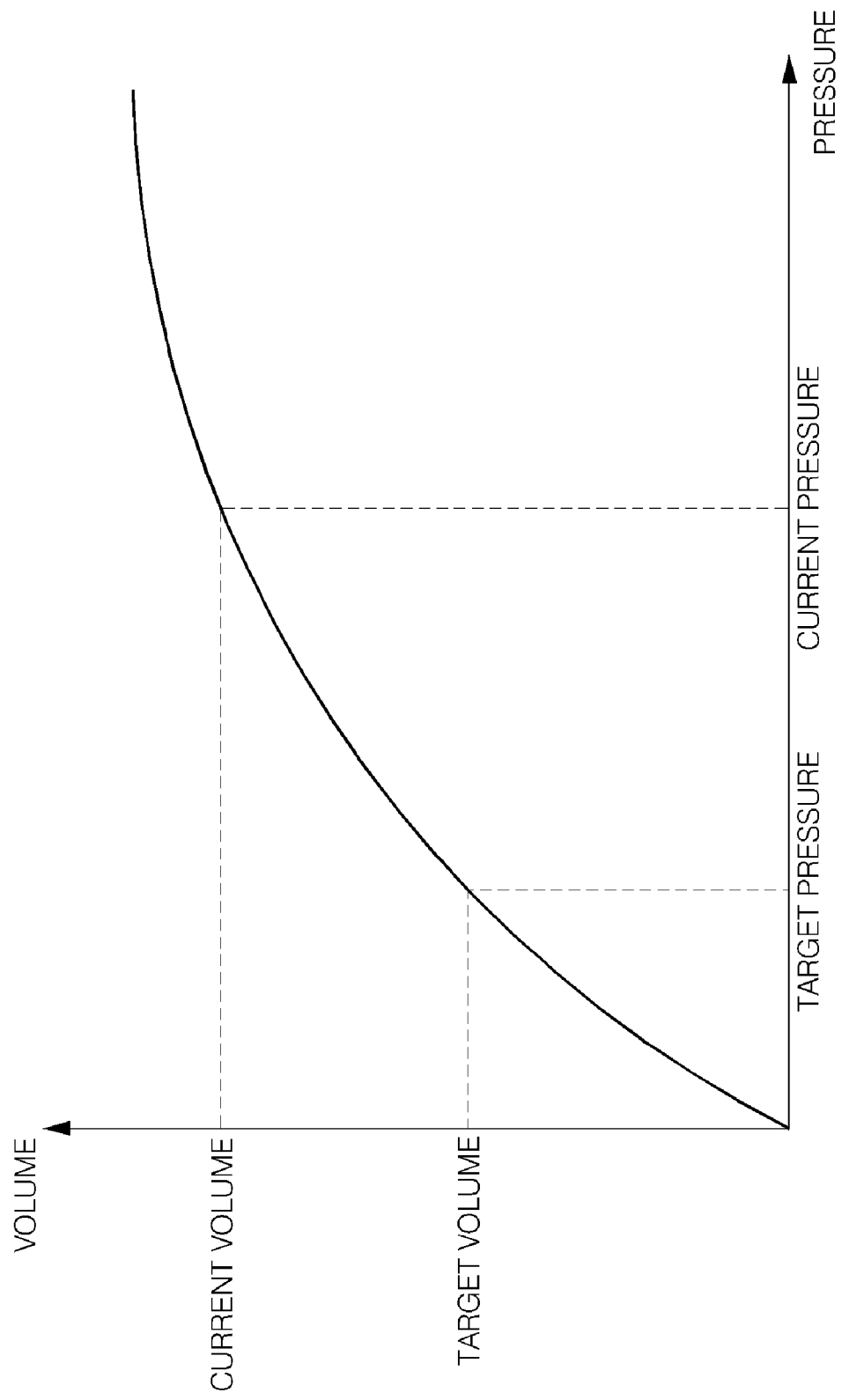
FIG. 4 is a graph illustrating a pressure-volume diagram of brake oil according to the present invention.

FIG. 2 is a flowchart illustrating a method of controlling the brake system according to the present invention, FIG. 3 is a graph illustrating a relationship between a delayed operating time of the valve and a difference in pressure between both ends of the valve, and FIG. 4 is a graph illustrating a pressure-volume diagram of brake oil.

Referring to FIGS. 2 to 4, when the driver presses the brake pedal 1, the controller 40 of the brake system determines whether the current braking situation is any one of the ABS, VDC, and TCS braking situations based on a stroke value detected by the stroke sensor 2, and transmits a valve operating command corresponding to the braking situation to the first to fourth outlet valves 85, 86, 87, and 88, which allows the reservoir 100 to collect the brake oil flowing into the wheel brake cylinders 31, 32, 33, and 34, and the first to fourth inlet valves 81, 82, 83, and 84, which supply the brake oil to the wheel brake cylinders 31, 32, 33, and 34 (S110).

In this case, the controller 40 computes a delayed operating time of the valve based on a difference in pressure between both ends of each of the first to fourth inlet valves 81, 82, 83, and 84 and the first to fourth outlet valves 85, 86, 87, and 88, and calculates an actual valve operating time of each of the first to fourth inlet valves 81, 82, 83, and 84 and the first to fourth outlet valves 85, 86, 87, and 88 (S120).

That is, when the valve operating command is transmitted to each of the first to fourth inlet valves 81, 82, 83, and 84 and the first to fourth outlet valves 85, 86, 87, and 88 according to the ABS, VDC, and TCS braking situations, a response speed of the valve needs to be considered at the time of estimating actual hydraulic pressure in the wheel brake cylinders 31, 32, 33, and 34.

In this case, based on the principle that the brake oil flows from a higher place to a lower place, a delayed response time increases as a difference in pressure between both ends of each of the first to fourth inlet valves 81, 82, 83, and 84 and the first to fourth outlet valves 85, 86, 87, and 88 is decreased, and the delayed response time relatively decreases as the difference in pressure between both ends of each of the first to fourth inlet valves 81, 82, 83, and 84 and the first to fourth outlet valves 85, 86, 87, and 88 is increased.

Next, whether the control command for the valve is a linear control command at the time of increasing pressure is determined (S130).

When the control command for the valve is the linear control command at the time of increasing pressure, the linear control is carried out, and the quantity (volume) of the brake oil passing through the respective first to fourth inlet valves 81, 82, 83, and 84 is calculated based on the pressure-volume diagram of the brake oil as illustrated in FIG. 4 (S140).

In this case, the controller 40 may calculate the quantity of brake oil based on the following Equation 1.

$$V_{inlet\text{-}value} = pV_{Curve}(P_{PreviousPressure} + \Delta P) - V_{PreviousVolume} \quad \text{[Equation 1]}$$

In this case, $pV_{curve}$ is a gradient of the pressure-volume diagram, $P_{previousPressure}$ is pressure at the time of previous brake control, $\Delta P$ is an amount of increasing pressure at the time of current brake control according to the linear command at the time of increasing pressure, $V_{PreviousVolume}$ is the quantity of passing brake oil at the time of the previous brake control, and $V_{inlet\text{-}value}$ is the quantity of passing brake oil at the time of the current brake control.

That is, the controller 40 may calculate the quantity of brake oil passing through the respective first to fourth inlet valves 81, 82, 83, and 84 based on the linear control command at the time of increasing pressure, by adding the pressure at the time of previous brake control to the amount of increasing pressure at the time of the current brake control, by using the pressure-volume diagram illustrated in FIG. 4.

Meanwhile, when it is determined in step S130 that the control command for the valve is not the linear control command at the time of increasing pressure, whether the control command is the ON-OFF control command for decreasing pressure is determined (S150). When it is determined that the control command is the ON-OFF control command at the time of decreasing pressure, the ON-OFF control at the time of decreasing pressure is carried out, and the quantity of brake oil passing through the respective first to fourth outlet valves 85, 86, 87, and 88 is calculated based on the pressure-volume diagram illustrated in FIG. 4 and a predetermined flow equation (S160).

Here, the ON-OFF control controls the opening area of the valve by controlling magnetic force of the valve.

Meanwhile, the controller 40 may calculate the quantity of brake oil passing through the respective first to fourth outlet valves 85, 86, 87, and 88 according to the ON-OFF control at the time of decreasing pressure based on the following Equation 2.

$$q = \alpha A \sqrt{\frac{2}{\rho}} \sqrt{P}$$ [Equation 2]

$$V_{Request} = q(T_{requestTime} - T_{ResponseTime})$$

In this case, q is the quantity of brake oil passing through the outlet valve per unit time, $\alpha$ is a correction factor, A is an opening area of the outlet valve, $\rho$ is fluid density of the brake oil, P is a difference in pressure between both ends of the outlet valve, $V_{Request}$ is the (target) quantity of brake oil passing through the outlet valve, $T_{RequestTime}$ is a requested operating time of the outlet valve, and $T_{ResponseTime}$ is a delayed operating time of the outlet valve according to the difference in pressure between both ends of the outlet valve.

Meanwhile, when it is determined in step S150 that the control command is not the ON-OFF control command at the time of decreasing pressure, that is, when it is determined that the control command is the ON-OFF control command at the time of increasing pressure, the controller 40 calculates the quantity of brake oil passing through the first to fourth inlet valves 81, 82, 83, and 84 based on the flow equation of Equation 2 (S170). In this case, in the Equation 2, the outlet valve means the inlet valve.

After step S170, the controller 40 may calculate hydraulic pressure in the wheel brake cylinders 31, 32, 33, and 34 based on the quantity of brake oil, that is, the quantity of brake oil passing through the respective first to fourth inlet valves 81, 82, 83, and 84 and the quantity of brake oil passing through the respective first to fourth outlet valves 85, 86, 87, and 88 (S180).

That is, the controller 40 may calculate the quantity of brake oil in the wheel brake cylinders by adding the quantity of brake oil passing through the inlet valves at the time of increasing pressure to the quantity of brake oil in the wheel brake cylinders at the time of previous control, and by subtracting the quantity of brake oil passing through the outlet valve at the time of decreasing pressure, and may finally calculate hydraulic pressure in the wheel brake cylinders 31, 32, 33, and 34 based on the following Equation 3.

$$P_c = pV_{curve}(V_{pr} + V_{inlet\text{-}valve} - V_{outlet\text{-}valve})$$ [Equation 3]

$P_c$ is calculated pressure, $pV_{curve}$ is a gradient of the pressure-volume diagram, $V_{pr}$ is the quantity of brake oil in the wheel brake cylinders at the time of previous control, $V_{inlet\text{-}valve}$ is the quantity of brake oil passing through the inlet valve at the time of increasing pressure, and $V_{outlet\text{-}valve}$ is the quantity of brake oil passing through the outlet valve at the time of decreasing pressure.

Wherein, a value of the $V_{outlet\text{-}valve}$ is not accounted, the $V_{outlet\text{-}valve}$ may be deleted from the Equation 3.

Unless explicitly described to the contrary, the term "comprising", "including", or "having" will be understood to imply the inclusion of stated constituent elements but not the exclusion of any other constituent elements.

While the exemplary embodiments of the present invention have been illustrated and described above, the present invention is not limited to the aforementioned specific exemplary embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

What is claimed is:

1. A method of operating a brake system, the method comprising:
    transmitting a valve operating command to an inlet valve which supplies brake oil to a wheel brake cylinder, and an outlet valve which allows the brake oil in the wheel brake cylinder to be returned into a reservoir;
    calculating a valve operating time of each of the inlet valve and the outlet valve based on a difference in pressure between both ends of each of the inlet valve and the outlet valve;
    determining whether the valve operating command is a linear control command for increasing pressure;
    performing the linear control and calculating the quantity of brake oil passing through the inlet valve based on a pressure-volume diagram of the brake oil when the valve operating command is the linear control command for increasing pressure; and
    calculating hydraulic pressure in the wheel brake cylinder based on the quantity of passing brake oil.

2. The method of claim 1, wherein the quantity of passing brake oil is calculated by a following equation, $$V_{inlet\text{-}value} = pV_{Curve}(P_{PreviousPressure} + \Delta P) - V_{PreviousVolume}$$ [equation]

wherein $pV_{curve}$ is a gradient of the pressure-volume diagram of the brake oil, $P_{previousPressure}$ is pressure at a time of previous brake control, $\Delta P$ is an amount of increasing pressure at a time of the current brake control according to the linear command at a time of increasing pressure, $V_{previousVolume}$ is a quantity of brake oil passing through the inlet valve at the time of previous brake control, and $V_{inlet\text{-}valve}$ is the quantity of brake oil passing through the inlet valve at the time of the current brake control.

3. The method of claim 2, wherein the hydraulic pressure is calculated by a following equation, $$P_c = pV_{curve}(V_{pr} + V_{inlet\text{-}valve})$$ [equation]

wherein Pc is calculated hydraulic pressure, $V_{pr}$ is the quantity of brake oil in the wheel brake cylinder at the time of previous brake control.

4. The method of claim 1, further comprising:
    determining whether the valve operating command is an ON-OFF control command for decreasing pressure when the valve operating command is not the linear control command for increasing pressure; and
    performing the ON-OFF control for decreasing pressure and calculating a quantity of brake oil passing through the outlet valve based on the pressure-volume diagram of the brake oil and a predetermined flow equation when the valve operating command is the ON-OFF control command for decreasing pressure.

5. The method of claim 4, wherein the ON-OFF control for decreasing pressure controls an opening area of the outlet valve.

6. The method of claim 4, wherein the quantity of brake oil passing through the outlet valve is calculated by a following equation, $$q = \alpha A \sqrt{\frac{2}{\rho}} \sqrt{P}$$ [equation]

$$V_{Request} = q(T_{requestTime} - T_{ResponseTime})$$

wherein q is the quantity of brake oil passing through the outlet valve per unit time, $\alpha$ is a correction factor, A is an opening area of the outlet valve, $\rho$ is fluid density of the brake oil, P is a difference in pressure between both ends of the outlet valve, $V_{Request}$ is the (target) quantity of brake oil passing through the outlet valve, $T_{RequestTime}$ is a requested operating time of the outlet valve, and $T_{ResponseTime}$ is a delayed operating time of the outlet valve according to the difference in pressure between both ends of the outlet valve.

7. The method of claim 4, wherein the hydraulic pressure is calculated by a following equation, $$P_c = pV_{curve}(V_{pr} + V_{inlet\text{-}valve} - V_{outle\text{-}valve})$$

wherein Pc is calculated hydraulic pressure, $pV_{curve}$ is a gradient of the pressure-volume diagram, $V_{pr}$ is the quantity of brake oil in the wheel brake cylinder at a time of previous brake control, $V_{inlet\text{-}valve}$ is a quantity of brake oil passing through the inlet valve at a time of current brake control, and $V_{outlet\text{-}valve}$ is a quantity of brake oil passing through the outlet valve at the time of the current brake control.

8. The method of claim 4, further comprising:
performing the ON-OFF control command for increasing pressure by determining that the valve operating command is the ON-OFF control command for increasing pressure when the valve operating command is not the ON-OFF control command for decreasing pressure, and calculating a quantity of brake oil passing through the inlet valve based on the pressure-volume diagram of the brake oil and a predetermined flow equation.

9. The method of claim 8, wherein the current quantity of brake oil in the wheel brake cylinder is calculated by adding the quantity of brake oil passing through the inlet valve according to the linear control for increasing pressure and the ON-OFF control for increasing pressure at the time of current brake control to the quantity of brake oil in the wheel brake cylinder at the time of previous brake control, and by subtracting the quantity of brake oil passing through the outlet valve according to the ON-OFF control for decreasing pressure at the time of current brake control, and the hydraulic pressure is calculated, based on the calculated quantity of brake oil.

* * * * *